United States Patent Office 3,840,655
Patented Oct. 8, 1974

3,840,655
DIAGNOSTIC METHODS AND REAGENTS FOR
INFECTIOUS MONONUCLEOSIS
Robert A. Lerner, Somerville, N.J., assignor to Ortho
Pharmaceutical Corporation
No Drawing. Continuation of abandoned application Ser.
No. 725,490, Apr. 30, 1968. This application July 28,
1971, Ser. No. 167,038
Int. Cl. G01n 31/00, 31/02, 33/00
U.S. Cl. 424—12                                    10 Claims

ABSTRACT OF THE DISCLOSURE

The heterophile antigen for human infectious mononucleosis antibodies is removed from horse and beef erythrocytes by controlled sonication of the same in a suspending medium. The antigen is isolated by precipitation and centrifugation and used as a basis for a diagnostic test for infectious mononucleosis. The test reagent contains in suspension the antigen along with serum coated latex particles.

CROSS REFERENCE TO RELATED APPLICATION

This is a continuation of application Ser. No. 725,490, filed Apr. 30, 1968, now abandoned.

BACKGROUND OF THE INVENTION

Human infectious mononucleosis antibodies are heterophyllic, that is, they react with antigens that are not responsible for their production. For example, it is well known that human infectious mononucleosis antibodies will agglutinate with sheep, horse and specially treated beef erythrocytes. A number of commercially available diagnostic tests for infectious mononucleosis are based on this reaction. Unfortunately, the agglutination of sheep and horse erythrocytes is not specific for infectious mononucleosis antibodies and will also occur with Forssman antibodies and, for this reason, a direct agglutination test for mononucleosis cannot be based on the same.

This problem is presently overcome through the differential absorption of the serum to be tested. For example, it is known that after infectious mononucleosis sera is absorbed with guinea pig kidney suspension, the sera will still agglutinate with horse erythrocytes. On the other hand, when absorbed with beef erythrocyte stroma, the infectious mononucleosis sera will aglutinate with the horse erythrocytes in only about 30 percent of the cases. Only about 10 percent of normal or Forssman containing sera will agglutinate with the horse erythrocytes after absorption with either guinea pig kidney suspension or beef erythrocyte stroma, and, of the sera which will agglutinate, 7 out of 10 cases will exhibit earlier and/or stronger agglutination after absorption with the beef erythrocyte stroma than after absorption with the guinea pig kidney suspension. The remaining 3 out of 10 cases will only show agglutination after absorption with beef erythrocyte stroma.

Thus, in carrying out the most often used of the presently available tests, the serum to be tested is combined on one half of a slide with guinea pig kidney suspension and on a second half of a slide with the beef erythrocyte stroma. The horse erythrocytes are added and if, after one minute the sera agglutinates sooner and stronger on the slide containing the guinea pig kidney suspension than on the slide containing the beef erythrocyte stroma, the test is considered positive. This test is the well-known "spot" test of Drs. Davidsohn and Lee.

The above-noted test is most specific, and therefore, most accurate when horse red blood cells are used which have not been formalized. Unfortunately, these unformalized cells have a limited period of stability, and therefore, the test reagent has a shelf life of only about 3 months.

THE INVENTION IN GENERAL

A direct agglutination test for infectious mononucleosis has now been developed. Since it is a direct test, it avoids the use of a multiplicity of reagents and complicated and time-consuming procedures. The test is equivalent in accuracy to previously known tests for infectious mononucleosis and utilizes a reagent which has indefinite shelf-life.

This test, like the prior art tests, is based on the agglutination of the human infectious mononucleosis antibody with a heterophyllic antigen, but here the antigen is isolated both from other antigens which agglutinate with antibodies in human serum and from the red cells which carried the antigen. By utilizing the heterophyllic antigen alone rather than red cells containing the antigen, the possible nonspecific agglutination of Forssman antibodies with other heterophyllic antigens present on the red cell is avoided. This, in turn, eliminates the necessity for differential absorption of the sera to be tested with guinea pig kidney and beef suspension erythrocyte stroma. In addition, since the test reagent contains the antigen isolated from the remainder of the red blood cell, the reagent on which the test is based has an indefinite shelflife.

The reagent on which the test is based is a suspension of finely divided stroma of only the active heterophile antigen of horse or beef erythrocytes. The antigen is obtained by the controlled sonification of beef or horse erythrocytes, in the manner described more fully hereinafter.

In its preferred commercial form, the reagent also comprises from about 0.25 to about 0.75 percent by volume of a synthetic latex resin coated with either animal or human serum. The serum-coated latex renders the agglutination visibly identifiable without substantially accelerating or promoting the agglutination. The reagent may further comprise from about 1 to about 2 percent by volume of bovine serum albumin or the like to raise the dielectric constant of the reagent to a level at which agglutination more rapidly takes place.

In performing the test, two drops of the reagent are placed on the slide along with one drop of the sera of the patient. After thorough mixing and rotating the slide, the presence or absence of agglutination is noted. The test for infectious mononucleosis can be completed in approximately 2 minutes.

THE INVENTION IN DETAIL

A. Preparation and Isolation of the Antigenic Stroma

1. Preparation of the Cell-Suspending Medium and Collection of the Cells.—An appropriate cell-suspending medium must be prepared prior to collecting the red blood cells. One such acceptable medium comprises:

|  | Grams |
|---|---|
| Anhydrous dextrose, USP | 20.5 |
| Tri-Sodium citrate | 8.0 |
| Sodium chloride | 4.2 |
| Citric acid | 0.55 |
| Neomycin sulfate | 0.10 |
| Chloromycetin | 0.33 | dissolved in distilled water and brought to one liter. The pH of this medium should be buffered to a pH of from about 6.1 to about 6.2. The specific conductance should be a minimum of $6.39 \times 10^{-3}$ mohs at 0 to 1° C. If the suspending medium is to be stored prior to use, it should be stored at between 4 and 6° C.

While the use of horse cells is preferred, and specifically described hereinafter, beef cells can also be utilized. Methods of red cell collection are well known in the art. In one suitable method an equal volume of the cell suspending medium for the amount of cells to be collected is introduced into collection bottles. The blood is aseptically collected from the shaved neck of a healthy horse and introduced into the bottle. A volume of anticoagulant equal to the whole blood collected is also introduced into the bottle. The whole blood is transferred to centrifuge tubes and centrifuged for 25 minutes at 1700 r.p.m. at 4° C. The supernate plasma is siphoned off and replaced with an equal volume of the suspending medium. The entire mixture is centrifuged twice more to isolate the red blood cells. The packed red cells are introduced into a flask of horse cell-suspending medium at a 20 percent suspension by volume and mixed gently for 15 minutes.

The method of cell collection and of processing of the horse cells described above does not constitute a claimed part of the present invention and the techniques described above are well known in the art. The invention is, therefore, not limited by the above-described method of collecting the cells and any acceptable method known to those skilled in the art will be satisfactory.

2. Isolation of the Heterophyllic Antigen.—The method of isolating the active antigen which I have invented includes the controlled sonification of the cells in a suspending medium. In this process, there is no critical concentration of the cells in the suspending medium but a concentration of between 17 and 23 percent by volume is preferred. The cell concentration is confirmed utilizing a Wintrobe hematocrit tube and techniques well known in the art. The suspended cells are preferably sonified at a power input of between about 6.0 and about 15.0 watt-seconds per cubic centimeter at a frequency of between 15 and 25 kc.

It is important in carrying out the test described hereinafter that the antigen stroma be finely divided. If the power input of the sonifier is much greater than about 15.0 watt-seconds per cubic centimeter, the stroma pieces will be granular rather than finely divided. When carrying out the test, granular stroma will render the results extremely difficult to read. In addition, at higher power inputs other antigens such as the Forssman antigen may become detached from the cell. If the power input is excessively high, the red blood cell itself will break down. If the power input is less than about 6.0 watt-seconds per cubic centimeter, the antigen yield will, at best, be extremely low and the process wil not be commercially feasible. It is for these same reasons that the sonification frequency is preferably betweenn 15 and 25 kc.

Preferably, the Bronson sonifier with a broad tip is used with 300 milliliter volumes of suspended horse cells. Using a power input of 125 watts and a frequency of 30 kc., it is found that when sonification is carried out for from 5 to 10 seconds the stromal fragments containing the active heterophile antigen are not detached from the cell. If sonification is carried out for approximately 15 seconds, the stromal fragments containing the active heterophile antigen begin to come off of the red cell, however, the yield is extremely low. The optimim yield of stromal fragments containing the active heterophile antigen is obtained when sonification is carried out for about 30 seconds. If sonification extends for a longer period of time, such as about 35 seconds, the stromal fragments continue to come off but do so in larger granular pieces which result in nonspecific agglutination on the slide when the reagent is used. If sonification extends for as much as 45 seconds, all of the stromal fragments are granular.

The heterophile antigen is next separated from the suspending medium and from the residue of the red blood cells. This can be accomplished by centrifugation of the sonicated medium followed by the precipitation of the antigen from the supernate. Methanol is preferably used to precipitate the antigen, however, many other substances equally satisfactory would be known by one skilled in the art and the choice of the precipitating agent does not constitute a part of this invention. When using methanol, some antigen will be precipitated no matter what methanol concentration is used. However, from the standpoint of commercial practicality, it is necessary to maximize the yield of the active antigen and, in this connection, it has been found that the methanol should be present in an amount of at least about 50 percent by volume. Only partial precipitation of the active fraction will be obtained if the methanol content falls much below about 30 percent by volume. By way of example, the sonicated medium can be centrifuged for about one hour at 6500 r.p.m. at 50° C. The supernate is kept at a temperature of from 4 to 6° C. and then reduced to $-5°$ C. at which point an equal volume of 100 percent methanol is added to the supernate solution. After stirring for 15 minutes, the precipitated solution is placed in a centrifuge for another hour at 6500 r.p.m. at $-5°$ C. The supernate fluid is siphoned off and discarded and the sediment, that is, hemoglobin and the active antigen, resuspended in 750 mililiters of saline solution. This procedure is repeated three times, at which point the amount of saline solution in which the antigen is suspended is reduced to 350 mililiters. The centrifugation and siphoning is repeated twice more for 30 minutes at 6500 r.p.m.'s at 5° C. The sediment of the final centrifugation is suspended in 375 milliliters of saline solution and heated at 56° for 30 minutes. Centrifugation is again carried out and the sediment suspended in a borate buffer at a pH of 8.6. The final antigen suspension is in 375 mililiters of the borate buffer at a pH of 8.6. It is stored at from 4 to 6° C. until needed.

B. The Reagent

1. Antigen.—As noted earlier, the reagent comprises a suspension of finely divided fragments of only the active heterophile antigen. In order for the test in which the reagent is utilized to be easily read, it is necessary to have a relatively high concentration of the active heterophile antigen. Thus, the antigen should be present in an amount of at least about 1.0 or 1.5 percent by volume. If the antigen is present in much lesser amounts, the test will "miss" weak infectious mononucleosis sera.

2. Latex Particles.—If the test were based on a reagent consisting solely of a suspension of the isolated active heterophile antigen, the test would be extremely difficult to read. Therefore, it is important that some foreign body which does not significantly promote or retard agglutination and which is visibly identifiable only after agglutination be included in the reagent. Any suitable substance having the properties noted my be utilized, but it has been found that serum-coated latex particles are particularly satisfactory. When added to the suspension in small amounts, the particles are not visually identifiable. After agglutination takes place, thus causing a substantial number of the latex particles to accumulate at any one point, the same become easily identifiable, thus, resulting in a test which can be easily read. When latex particles are utilized, it is best to use particles having a diameter of between about 0.20 and about 0.80 microns, and particles having a diameter of not much greater than 0.30 microns are preferred.

Uncoated latex particles have a tendency to adsorb materials to their surface and at times this may yield non-specific cross linking or agglutination, and it is for this reason that either human or animal serum is introduced into the reagent to coat the latex particles. Serum-coated latex particles, however, when present in an amount much greater than about 0.75 percent by volume will make the test difficult to read.

Therefore, taking all of the above factors into consideration, it is preferable that the latex particles be present in an amount of from about 0.25 to about 0.75 percent by volume. As can be seen from the above discussion, the amount of human serum utilized is directly related to the amount of latex present and also to the size of the latex particles. Therefore, while the amount of serum is important the precise amount required cannot be defined except indirectly, that is, enough serum should be present to substantially coat most of the latex particles.

For example, when latex particles of about 0.22 microns are utilized in an amount of about 0.5 percent by volume, it is found that the serum should be present in the reagent in an amount of from about 10 to about 15 percent by volume.

By way of example, Dow latex particles having a diameter of 0.22 microns can be utilized. Dow latex particles of such size are commercially available materials and are monodispersed spheres of polystyrene. The latex particles are centrifuged in a 50 percent suspension for one hour at 16,000 r.p.m. at 5° C. The particles are resuspended in a borate buffer having a pH of 8.6 and again centrifuged as noted above. The latex particles are once again resuspended at 4 percent by volume in the borate buffer and stored at from 4 to 6° C. until needed for addition to the reagent. When preparation of the reagent is imminent, 125 milliliters of the 4 percent latex are added to 125 milliliters of inactivated serum and stirred gently for one hour.

3. Adjustment of the Dielectric Constant.—If a reagent consisting only of the active heterophile antigen and the serum-coated latex is utilized as a basis for a test for infectious mononucleosis, the agglutination will be weak and/or slow and the test difficult to read. This is due to the fact that the reagent would be inhospitable to agglutination due to its relatively low dielectric constant. It is therefore preferable that the dielectric constant be increased suitably by the addition of a protein-like substance such as one of the amino acids or bovine or human serum albumin. The addition of an excessive amount of such an agent will, however, result in nonspecific agglutination. By way of example, if bovine serum albumin is used it should be present in the reagent in an amount of from about 1 to about 2 percent by volume. In completing the reagent then, 250 milliliters of 6 percent bovine serum albumin in saline is suitably added to 250 milliliters of serum-coated latex particles in borate buffer and stirred gently for one hour. This mixture is added to 500 milliliters of the heterophile antigen in borate buffer and again the final mixture stirred for one hour.

C. The Test Method

In one method of carrying out the test, one drop of the serum to be tested is placed on a black slide along with two drops of the reagent. The serum and reagent are well-mixed and the slide is rotated. After approximately 2 minutes, the absence or presence of agglutination is noted. The presence of agglutination indicates a positive test for infectious mononucleosis while the absence of agglutination indicates the absence of infectious mononucleosis while the absence of agglutination indicates the absence of infectious mononucleosis antibodies. If this test is repeated using Forssman containing serum and normal serum, no agglutination should be noted and in carrying out this test using the reagent, the preparation of which has been described herein, no agglutination was noted with normal or Forssman containing serum. A 4+ agglutination is noted with high titer infectious mononucleosis serum.

What is claimed is:

1. A process for preparing a heterophile antigen for infectious mononucleosis antibodies from horse or beef erythrocytes which comprises sonifying a suspension of beef erythrocytes in an erythrocyte suspending medium for a time and under conditions which are sufficient to liberate finely divided stromal fragments containing said antigen from said erythrocytes, but are insufficient to liberate antigens which result in nonspecific agglutination with other antibodies of human sera, the conditions of sonification comprising applying to the erythrocyte suspension a power input of from about 6.0 to about 15.0 watt-seconds per cubic centimeter at a frequency of from about 15 to about 25 kc., and thereafter separating the detached stromal fragments containing said antigen from the erythrocytes by subjecting the sonicated suspension to centrifugation to yield a residue of erythrocytes and a supernate containing said stromal fragments, and thereafter precipitating said fragments from said supernate, and discarding the supernate.

2. The process of claim 1 wherein the sonification of the erythrocytes is carried out for a period of about 30 seconds.

3. The process of claim 1 wherein the erythrocyte suspending medium is buffered to a pH of about 6.1 to about 6.2.

4. The heterophile antigen for infectious monoculeosis prepared by the method of claim 1.

5. In the method of diagnosing infectious mononucleosis which comprises mixing a heterophile antigen reagent with the test serum and noting the presence or absence of agglutination, the improvement which comprises employing as the reagent the heterophile antigen of claim 4.

6. A diagnostic reagent for identification of infectious mononucleosis which comprises, in a buffered suspending medium the heterophile antigen of claim 4, and a synthetic latex resin coated with animal or human serum.

7. The reagent of claim 6 wherein said antigen is present in an amount of at least about 1.5 percent by volume based on the entire reagent.

8. The reagent of claim 6 wherein there is present in said medium a borate buffer and the pH of said reagent is 8.6.

9. The reagent of claim 6 wherein there is additionally present from about 1 to about 2 percent by volume of bovine albumin.

10. In the method of diagnosing infectious mononucleosis which comprises mixing a heterophile antigen reagent with the test serum and noting the presence or absence of agglutination, the improvement which comprises employing as the reagent the diagnostic reagent of claim 6.

References Cited

UNITED STATES PATENTS

| | | | |
|---|---|---|---|
| 3,074,853 | 1/1963 | Brewer | 424—12 |
| 3,551,555 | 12/1970 | Schunrs | 424—12 |
| 3,426,123 | 2/1969 | Hoff | 424—12 |

OTHER REFERENCES

Milgrom, J. Immunol., Vol. 98, 1967, pp. 102–109.
Barron, J. Immunol. Vol. 99, 1967 pp. 778–784.
Schwarzweiss, PSEBM, Vol. 69, 1948 pp. 558–561.
Milzer, PSEBM, Vol. 66, 1947 pp. 619–621.

ALBERT T. MEYERS, Primary Examiner
ANNA P. FAGELSON, Assistant Examiner

U.S. Cl. X.R.
424—11, 13, 88

PO-1050
(5/69)

UNITED STATES PATENT OFFICE
CERTIFICATE OF CORRECTION

Patent No. 3,840,655          Dated October 8, 1974

Inventor(s) Robert A. Lerner

It is certified that error appears in the above-identified patent and that said Letters Patent are hereby corrected as shown below:

In Column 1, line 45, "aglutinate" should read --- agglutinate ---.

In Column 3, line 44, "wil" should read --- will ---.

In Column 3, line 49, "30 k.c" should read --- 20 k.c. ---.

In Column 3, line 56, "Optimim" should read --- optimum ---.

In Column 4, line 8, "50°C" should read --- 5°C ---.

In Column 4, line 16, "mililiters" should read --- milliliters ---.

In Column 4, line 19, "mililiter" should read --- milliliter ---.

In Column 4, line 26, "mililiter" should read --- milliliter ---.

In Column 5, line 51, "While the absence of agglutination indicates the absence of infectious mononucleosis" should be deleted, second occurrence.

In Claim 4, line 21, "monoculeosis" should read --- mononucleosis ---.

Signed and sealed this 6th day of May 1975.

(SEAL)
Attest:

RUTH C. MASON
Attesting Officer

C. MARSHALL DANN
Commissioner of Patents
and Trademarks